(12) United States Patent
Ohtsuka (10) Patent No.: US 6,456,985 B1
(45) Date of Patent: Sep. 24, 2002

(54) IMAGE ENCRYPTING METHOD AND DEVICE, IMAGE DECRYPTING METHOD AND DEVICE, AND RECORDING MEDIUM

(75) Inventor: Shuichi Ohtsuka, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/382,543

(22) Filed: Aug. 25, 1999

(30) Foreign Application Priority Data

Aug. 25, 1998 (JP) .......................................... 10-238388

(51) Int. Cl.$^7$ ............................................. G06F 17/60
(52) U.S. Cl. .......................... 705/51; 705/50; 380/243; 380/54
(58) Field of Search ................................ 705/1, 50, 51, 705/57; 380/4, 5, 10, 9, 29, 37, 49, 54

(56) References Cited

U.S. PATENT DOCUMENTS

| | | | | |
|---|---|---|---|---|
| 4,459,611 A | * | 7/1984 | Arai et al. ................... | 358/119 |
| 5,715,316 A | * | 2/1998 | Steenblik et al. ............. | 380/54 |
| 5,933,499 A | * | 8/1999 | Enari ......................... | 380/10 |
| 6,154,840 A | * | 11/2000 | Pebley et al. ................ | 713/160 |
| 6,178,243 B1 | * | 1/2001 | Pomernatz et al. .......... | 380/243 |

FOREIGN PATENT DOCUMENTS

JP         09222982 A   *   8/1997   .............. G06F/3/14

OTHER PUBLICATIONS

Anderson, Ross J., Communications of the ACM v37, N 11, p 32–40 Nov. 1994.*
Microsoft Press Computer Dictionary 3rd Edition 1997, pp. 245 and 497.*

* cited by examiner

Primary Examiner—Hyung-Sub Sough
Assistant Examiner—Calvin L Hewitt, II (57) ABSTRACT

When image data has been decomposed into a plurality of components, and a plurality of components of the components have been encrypted, the encrypted image file must be able to be used without confusion. On a component decomposing apparatus, image data is decomposed into a plurality of components for the hierarchical levels, for example. On an encrypting apparatus, a plurality of components of the components are encrypted. And, on an encrypting information preparing means, encrypting information H concerning the contents of this encryption is prepared, and from the encrypted components and the non-encrypted components, and the encrypting information H, an encrypted image file F is generated on an encrypted image file generating apparatus. When the encrypted image file F is to be decrypted, the encryption contents of the encrypted components can easily be grasped by referring to the encrypting information H.

16 Claims, 7 Drawing Sheets

| | FUJI-TYPE-102 | FUJI-TYPE-122 |
|---|---|---|
| ① METHOD FOR ENCRYPTING OF COMPONENT | ENCRYPTING OF FOUR LOWER-BITS OF COMPONENT | ENCRYPTING OF WHOLE OF COMPONENT |
| ② COMPONENT ENCRYPTION SYSTEM | IDEA SYSTEM (CONFIDENTIAL KEY SYSTEM) | IDEA SYSTEM (CONFIDENTIAL KEY SYSTEM) |
| ③ ENCRYPTION SYSTEM FOR CONFIDENTIAL KEY USED IN ② | IDEA SYSTEM (CONFIDENTIAL KEY SYSTEM) | RSA SYSTEM (OPEN KEY SYSTEM) |

FIG.7b
THIS IMAGE IS AN IMAGE OF FUJI.
ANY PERSON OTHER THAN THE FUJI PHOTO MEMBERS CANNOT DISPLAY IT.
IF YOU ARE A MEMBER, PLEASE ENTER YOUR ID AND ENCRYPTION KEY NO.

FIG.7c

FIG.7d
FOR ORDERING, PLEASE FILL UP THE FOLLOWING BLANKS.
CUSTOMER;
CUSTOMER ID;
PRINT SIZE;
QUANTITY;

CUSTOMER; Ohtsuka
CUSTOMER ID; F8475215
QUANTITY; 3
PRINT SIZE; C
+
ENCRYPTED IMAGE

THIS IMAGE IS AN IMAGE OF FUJI.
ANY PERSON OTHER THAN THE FUJI PHOTO MEMBERS CANNOT DISPLAY IT.
IF YOU ARE A MEMBER, PLEASE ENTER YOUR ID AND ENCRYPTION KEY NO.

FIG.9d

CUSTOMER; Ohtsuka

CUSTOMER ID; F8475215

QUANTITY; 3

PRINT SIZE; C

TEMPLATE ID; 125894

IMAGE 1; Oh 102. fpx

IMAGE 2; Clip 416

+

ENCRYPTED IMAGE

FIG.10

IMAGE ENCRYPTING METHOD AND DEVICE, IMAGE DECRYPTING METHOD AND DEVICE, AND RECORDING MEDIUM

BACKGROUND OF THE INVENTION

1. Field of the Invention

The present invention relates to an image encrypting method and device which decomposes original image data into a plurality of components and encrypts them, a method and device which decrypts an encrypted image file which has been obtained by this image encrypting method and device, and a computer readable recording medium which records a program to cause a computer to execute these methods.

2. Description of the Related Art

For some applications which handle image data of popular talents, particular characters, etc. having their portrait rights or the copyright, it is required to inhibit that the image data is used for any purpose other than a specific one. In other words, if such image data having the copyright can be freely reproduced with general computers, there is the possibility of that the portrait rights and the copyright are infringed, thus it is required-that such image data be permitted to be printed out only by a particular authorized lab, and cannot be used for any other purposes.

Thus, a technique has been proposed which offers image data encrypted so that it can be decrypted only by the application software and the lab permitted to make printout. This technique is such that only the application software and a particular lab have the capability of decrypting encrypted image data, and the application software and the particular lab cannot output image data having the copyright, etc. for any purpose other than a particular one.

On the other hand, as a method for storing of image data, various methods, such as JPEG, GIF, and TIFF, are available, however, in recent years, the method has been proposed which hierarchically decomposes image data for the resolutions or density resolutions, and encodes the data for the hierarchical levels (the hierarchical data) to compress and store them. This storing method is such that it decomposes image data into hierarchical data for a plurality of resolutions or density resolutions by wavelet-conversion or other technique, and this decomposed data for the resolutions or density resolutions is encoded in the order of hierarchical levels to be compressed and stored as a file.

This storing method has the following features:

(1) Unlike the DCT method used with the prior art JPEG, the image data is not processed for each block, thus such an artifact as block distortion will not be caused.
(2) Because the image data is hierarchically encoded, only the information for the necessary resolution is required to be transferred in transferring the image data, thus efficient image transfer can be performed.
(3) Because the image data is decomposed for multiple resolutions or multiple density resolutions, a variety of image processes such as frequency emphasized processing can be performed relatively easily.
(4) Simultaneous spatial and frequency decomposition by multiple resolution analysis can be made, and for the low frequency region which has a great effect on the encoding efficiency, orthogonal transformation is performed in a wide range, while for the high frequency region, orthogonal transformation can be achieved in a narrow range, thus, if a quantization noise is generated around the edge in the image, the spatial spread can be suppressed. This makes the noise difficult to be perceived.

In addition, a file format which allows a plurality of data having different properties to be stored in a single file, as with the FlashPix file proposed by Eastman Kodak, has been proposed, and in such a file meeting the FlashPix specifications as this, hierarchical data decomposed for multiple resolutions or multiple density resolutions can also be stored.

Further, the methods which constitute an image file by, for example, decomposing the image data into a chromaticity signal and a luminance signal; decomposing it for the frequency components; decomposes it into $\alpha$-channel information representing the luminous transmittance of the image or into depth information representing the distances from the camera and RGB data; and decomposing the image into a plurality of blocks are used. In addition, for a plurality of images or a composite image obtained by composing an image with a template, the image file is constituted by data of each image, image layout information, character information, etc.

Thus, when an image file is constituted by a plurality of data (hereafter referred to as components), only particular components are encrypted in some cases. For example, when the image data has been hierarchized as stated above, only the hierarchical data having the highest resolution, which is the most valuable as image, is encrypted. With an image file wherewith only a part of the components has been encrypted, anyone can reproduce image data for the components which have not been encrypted, and the hierarchical data having the highest resolution which is suited for printout, etc. can be used only by a person having the decryption key for decrypting the encrypted hierarchical data. Therefore, any person other than the authorized person who has the right, having received the encryption key from the copyright holder for the image cannot use the image having the highest resolution, which allows prevention of illegal use of an image having the copyright, etc.

However, when a plurality of components of the components have been encrypted, it cannot be known that, by what encryption system, each component has been encrypted. Therefore, even the authorized person who has received the encryption key must try to decrypt all the encrypted components by use of that encryption key to know which component can be decrypted by the encryption key, thus the operation is extremely cumbersome. In addition, when an image file is to be brought into a lab to request printout, the user cannot know that the components required by him are to be brought into which lab for decryption, great confusion is produced in printout request.

The purpose of the present invention, which has been provided by taking the above-stated situation into consideration, is to offer an image encrypting method and device whereby, when a plurality of components of the components have been encrypted, the encrypted components can be decrypted without confusion; an image decrypting method and device; and a computer readable recording medium which records a program to cause a computer to execute these methods.

SUMMARY OF THE INVENTION

The image encrypting method according to the present invention comprises the steps of:

decomposing original image data into a plurality of components;

encrypting a plurality of desired components of the components;

preparing encrypting information representing the contents of the encryption;

generating an encrypted image file from the encrypted components which have been encrypted, and the non-encrypted components which have not been encrypted; and attaching the encrypting information to the encrypted image file.

Here, it is preferable that the components be any of resolution image data obtained by decomposing the original image data into a plurality of resolutions, luminance information data and chromaticity information data of the original image data, frequency data representing the spatial frequency components of the original image data, and regional data for the regions given when the original image data is decomposed into a plurality of regions.

It is also preferable that each of the components be encrypted by an encryption system or encryption key which varies with each of the components.

Further, it is preferable that the encrypting information include at least one of information which indicates that encryption has been performed, encryption system information, encryption key information, image component information of the original image which has been encrypted, copyright information of the original image, and information of a decrypting means which can decrypt the encrypted components.

Here, "image component information of the original image" refers to information representing what components the original image is decomposed into.

A first image decrypting method according to the present invention is a method which decrypts an encrypted image file which has been obtained with the image encrypting method according to the present invention, comprising the steps of:

reading out the encrypting information from the encrypted image file; and on the encrypting information, performing decryption of the encrypted components.

A second image decrypting method according to the present invention is a method which decrypts an encrypted image file which has been obtained with the image encrypting method according to the present invention, comprising the steps of:

reading out the encrypting information from the encrypted image file;

on the basis of the encrypting information, determining the decrypting means which can decrypt the encrypted components; and transferring the encrypted image file to the decrypting means determined.

The image encrypting device according to the present invention comprises:

a component decomposing means which decomposes original image data into a plurality of components;

an encrypting means which encrypts a plurality of desired components of the components;

an encrypting information preparing means which prepares encrypting information representing the contents of the encryption;

an encrypted image file generating means which generates an encrypted image file from the encrypted components which have been encrypted, and the non-encrypted components which have not been encrypted; and an attaching means which attaches the encrypting information to the encrypted image file.

It is preferable that the encrypting means be a means for encrypting each of the components by an encryption system or encryption key which varies with each of the components.

A first image decrypting device according to the present invention is a device which decrypts an encrypted image file which has been obtained with the image encrypting device according to the present invention, comprising:

an encrypting information reading means which reads out the encrypting information from the encrypted image file; and a decrypting means which, on the encrypting information, performs decryption of the encrypted components.

A second image decrypting device according to the present invention is a device which decrypts an encrypted image file which has been obtained with the image encrypting device according to the present invention, comprising:

an encrypting information reading means which reads out the encrypting information from the encrypted image file;

a determining means which, on the basis of the encrypting information, determines the decrypting means which can decrypt the encrypted components; and a transferring means which transfers the encrypted image file to the decrypting means determined.

The program to cause a computer to execute the procedures to be taken by the encrypting and decrypting methods according to the present invention may be offered, being recorded on a computer readable recording medium.

According to the present invention, original image data is decomposed into a plurality of components, and when a plurality of desired components of these components are encrypted, encrypting information representing the contents of the encryption is generated, the encrypting information being attached to an encrypted image file comprising the encrypted components and the non-encrypted components. Therefore, by referring to the encrypting information, how the encrypted components have been encrypted can be easily known, and as a result of this, the encrypted image file F can be used with no confusion.

Especially, when the components have been encrypted by the different encryption systems or encryption keys, respectively, the person who has received the encrypted image file can refer to the encrypting information for easily identifying what level of components he can decrypt by using the encryption key he has.

By including the information of the decrypting means which can decrypt the decrypted components, for example, the information of the lab in the encrypting information, the person who has received the encrypted image file can easily identify which lab can be requested to decrypt the desired components, thus, without confusion, the lab which has the desired decrypting means can be requested to make printout.

DESCRIPTION OF THE PREFERRED EMBODIMENT

Hereinbelow, a preferred embodiment of the present invention will be explained with reference to the accompanying drawings.

Figure 1:
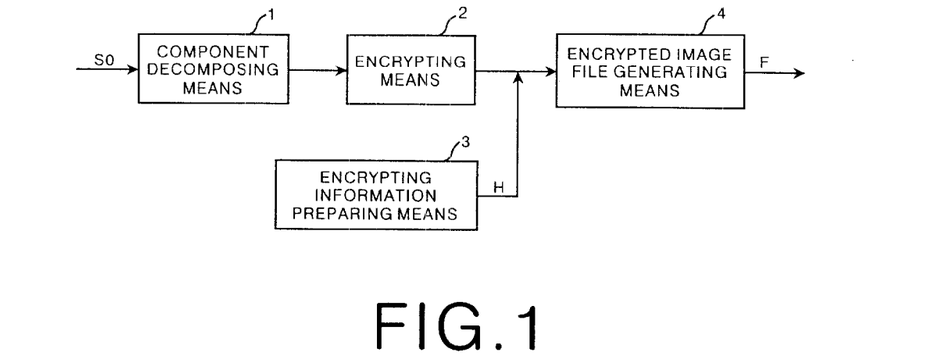
FIG. 1 is a schematic block diagram illustrating the configuration of an image encrypting device according to the embodiment of the present invention.

FIG. 1 shows a schematic block diagram illustrating the configuration of an image encrypting device according to the embodiment of the present invention. As shown in FIG. 1, the image encrypting device according to the present embodiment comprises a component decomposing means 1 which decomposes original image data S0 into a plurality of components; a component encrypting means 2 which encrypts a plurality of desired components of the components; an encrypting information preparating means 3 which prepares encrypting information H representing the contents of an encryption; and an encrypted image file generating means 4 which generates an encrypted image file F on the basis of the encrypted components which have been obtained by encrypting them, the non-encrypted components which have not been encrypted, and the encrypting information H.

Figure 2A:
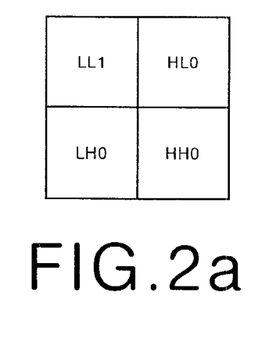
FIG. 2a to FIG. 2c show a set of drawings illustrating the state wherein image data is wavelet-converted to be encoded for the hierarchical levels.
Figure 2B:
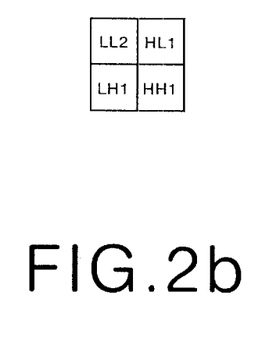
Figure 2C:
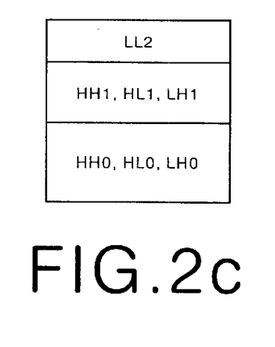

The component decomposing means 1 decomposes, for example, the original image data S0 into hierarchical data for a plurality of resolutions, providing the hierarchical data as components. The original image data S0 is decomposed into hierarchical data for the hierarchical levels in the following way. First, as shown in FIG. 2a, the original image data S0 is wavelet-converted, being decomposed into four types of data, LL1, HL0, LH0, and HH0, for the plurality of resolutions. Here, the data LL1 represents an image as a result of the length and breadth of the image being reduced to half, and the data HL0, LH0, and HH0 represent an image of the longitudinal edge component, the crosswise edge component, and the diagonal edge component, respectively. And, as shown in FIG. 2b, the data LL1 is further wavelet-converted to obtain four types of data, LL2, HL1, LH1, and HH1. Here, the data LL2 represents an image as a result of the length and breadth of the image being further reduced to half, and the data HL1, LH1, and HH1 represent an image of the longitudinal edge component, the crosswise edge component, and the diagonal edge component of the data LL1, respectively. Then, by repeating the wavelet conversion as many times as desired for the data LL which is obtained every time the wavelet conversion is performed, data for the plurality of resolutions is obtained. Thereafter, as shown in FIG. 2c, the data for the plurality of resolutions is encoded, and the encoded data is provided as the hierarchical data, i.e., components.

The method of decomposing data into components is not limited to that as stated above, and various other methods, such as the method which decomposes original image data S0 into a chromaticity signal and a luminance signal; the method which decomposes it for the frequency components; the method which decomposes it into α-channel information representing the luminous transmittance of the image or into depth information representing the distances from the camera and RGB data; and the method which decomposes an image into a plurality of blocks can be adopted. In addition, for a plurality of images or a composite image obtained by composing an image with a template, the method which provides data of each image, image layout information, character information, etc. as components can be adopted.

The encrypting means 2 encrypts desired components of the components. For such encryption, the method which encrypts the whole of the component to provide completely random data; the method which encrypts only a part of the bits of the component (for example, encrypts the four low-order bits of eight-bit data to provide random data); the method which encrypts data having a fixed value over the entire image to generate a random image, and adds this random image to the components; etc. can be used. Here, by providing the encrypted components with the same format and the same number of picture elements as those of the original image data S0, although the image quality is deteriorated by encrypting, the encrypted components can be displayed in an application to display the original image data S0. In the case when the image represented by the original image data S0 is decomposed into a plurality of blocks, and the image data for the blocks are provided as components, encrypting only a part of the blocks will display the original image as that a part whereof is deteriorated.

As the encryption system, the DES (Data Encryption Standard), IDEA (International Data Encryption Algorithm) or other confidential key system, or the RSA (Rivest, Shamir, Adleman) system, which is an encryption system using prime factors, or other open key system can be adopted.

Here, the confidential key system is a system wherein the encryption key to encrypt components is made common to the decryption key to decrypt encrypted components. The DES is a confidential key encryption system established by the National Bureau of Standards in U.S.A. and it uses a 64-bit key to convert a plaintext in units of 64 bits into a cryptogram of 64 bits. The IDEA is a confidential key encryption system designed to allow an efficient computation by use of software, and it uses a 128-bit key to convert a plaintext in units of 64 bits into a cryptogram of 64 bits.

The open key system, unlike the confidential key encryption system, is a system wherein the encryption key is different from the decryption one, being known as the asymmetrical encryption system. With the open key system, an encryption key uniquely corresponds to a decryption key, and the components which have been encrypted with the encryption key can be decrypted only with the decryption key corresponding to that encryption key. If this encryption key is opened to the public, the components which have been encrypted by use of the encryption key can be decrypted only by a particular person who has the decryption key corresponding to it. Therefore, this system is effective when information which can be decrypted only by a particular person is sent to that particular person by a number of other persons.

Because the open key system is slow in processing speed, it is preferable to use the confidential key system for encryption. As described later, it is preferable that the encryption key of the confidential key system which was used to encrypt the components be encrypted with a common confidential key shared by the devices having the right of decryption, and be included in the encrypted image file F as encrypting information. The encryption key of the confidential key system which was used to encrypt the components can also be encrypted by use of an open key to be included in the encrypted image file F as encrypting information. In this case, it is preferable that encryption be performed by use of the open key corresponding to the decryption key held by the devices having the right of decryption. If the open key is used in this way, the labor and danger in confidentially sharing the key between the image encrypting device and the later described image decrypting device can be avoided.

The encrypting information preparing means 3 is used to prepare as encrypting information H information which indicates encryption has been performed, encryption system information, information of the encryption key as stated above, image component information about the original image which has been encrypted, copyright information about the original image, information of the decrypting means which can decrypt the encrypted components, etc.

The encrypted image file generating means 4 generates an encrypted image file F from the encrypted components which are encrypted components, the non-encrypted components which have not been encrypted, and the encrypting information H.

Figure 3:
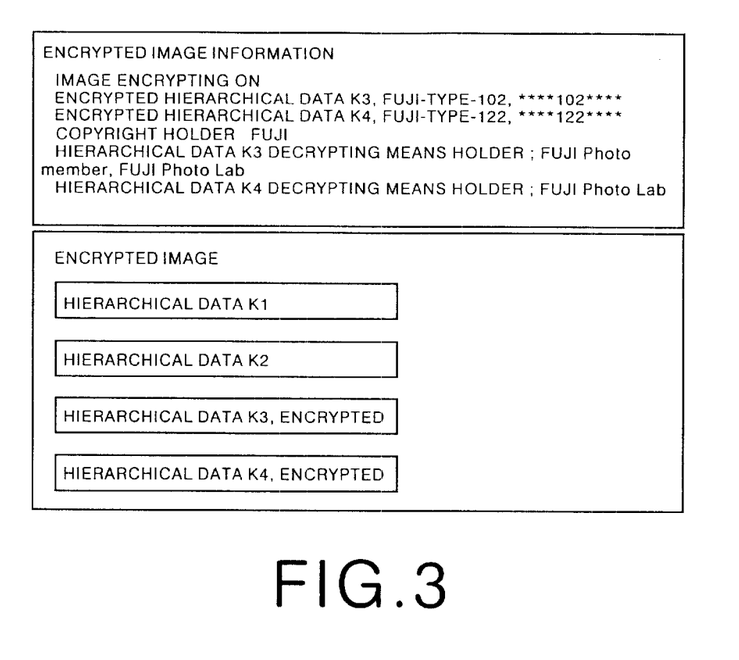
FIG. 3 shows a drawing for explaining the contents of the encrypted image file.

FIG. 3 shows a drawing illustrating the contents of the encrypted image file F. With the present embodiment, it is assumed that the original image data S0 has been hierarchized into four types of hierarchical data K1 to K4. In the encrypting information H are included the information indicating whether the components have been encrypted or not; if they have been encrypted, the information of the encryption system for the components (with the present embodiment, the hierarchical data K3 and K4); the information of the encryption key; the information of the copyright holder; and the information concerning the person or lab who can decrypt the encrypted hierarchical data K3 and K4. In other words, as shown in FIG. 3, this encrypted image file F reveals that the hierarchical data K3 and the hierarchical K4 have been encrypted by the encryption systems of FUJI-TYPE-102 and FUJI TYPE-122, respectively, accompanied by the encryption keys **102 and 122**, respectively. It can also be known that the copyright holder of the image is "FUJI"; the person who has the means of decrypting the hierarchical data K3 is "FUJI Photo member" and "FUJI Photo Lab"; and the person who has the means of decrypting the hierarchical data K4 is "FUJI Photo Lab".

Figure 4:
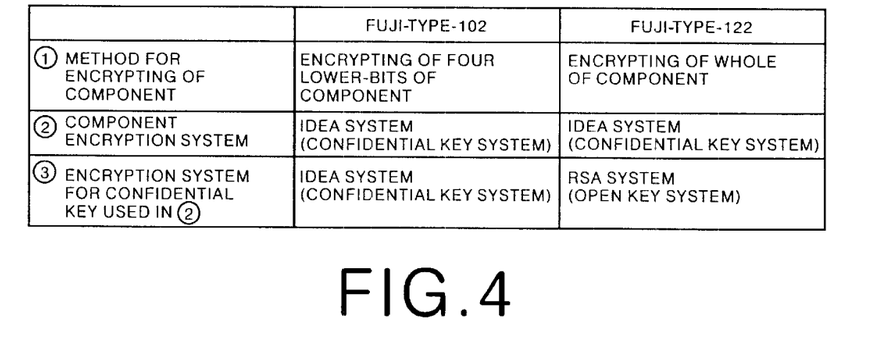
FIG. 4 shows a drawing for explaining the contents of the encryption systems.

Here, the encryption systems of FUJI-TYPE-102 and FUJI TYPE-122 have the contents as given in FIG. 4. As shown in FIG. 4, the FUJI-TYPE-102 is a system which uses the IDEA system to encrypt the four low-order bits of a component when the component comprises 8-bit data, and further encrypts the encryption key in this encryption by the IDEA system. On the other hand, the FUJI TYPE-122 is a system which uses the IDEA system to encrypt the whole of a component, and further encrypts the encryption key in this encryption by the RSA system. The IDEA confidential key system provides encryption by use of the confidential key commonly held by the FUJI Photo members, while the RSA open key system provides encryption by use of the open key held by the FUJI Photo Lab. The "***102" is the key which has further encrypted the key which has encrypted the hierarchical data K3, and this key can be decrypted with the use of the confidential key held by the FUJI Photo members. The "122**" is the key which has further encrypted the key which has encrypted the hierarchical data K4, and this key can be decrypted with the use of the decryption key held by the FUJI Photo Lab.

As shown in FIG. 4, the hierarchical data K4 has been encrypted for the entire image, and thus cannot be recognized as an image. In the FUJI Photo Lab, which can decrypt the hierarchical data K4, the key (**122**) which has been encrypted by use of the open key attached to the encrypted image file F is decrypted with the use of the decryption key held by the Lab. The decrypted key is the IDEA system key which has encrypted the hierarchical data K4, and by using this key, the hierarchical data K4 can be decrypted.

With the hierarchical data K4, only the four lower-order bits have been encrypted, thus, anyone can obtain an image equivalent to the four upper-order bits, however, the image obtained is only a blurred one. The FUJI Photo members and FUJI Photo Lab can use the confidential key held by them to decrypt the key (**102**) which has encrypted the hierarchical data K3, and in addition, by using the decrypted key, can decrypt the encrypted portion of the hierarchical data K3.

Figure 5:
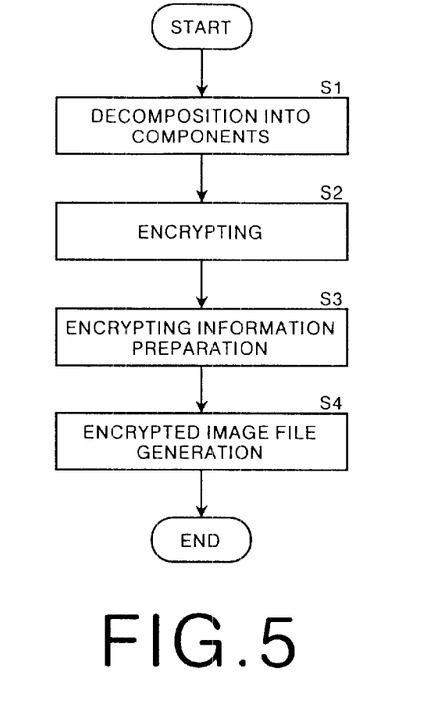
FIG. 5 is a flowchart illustrating the process provided by the image encrypting device according to the embodiment of the present invention.

Next, the function of the present embodiment will be explained. FIG. 5 shows a flowchart illustrating the processing provided by the image encrypting device according to the present embodiment. First, on the component decomposing means 1, the original image data S0 is decomposed into components of hierarchical data for a plurality of hierarchical levels (step S1) as shown in FIG. 2a to FIG. 2c above. Then, on the encrypting means 2, the hierarchical data K3 and the hierarchical data K4 are encrypted (step S2), and on the encrypting information preparing means 3, encrypting information H is prepared (step S3). Then, on the encrypted image file generating means 4, an encrypted image file F is generated to complete the processing, being based on the encrypted components (the hierarchical data K3 and K4), the non-encrypted components (the hierarchical data K1 and K2), and the encrypting information H.

Figure 6:
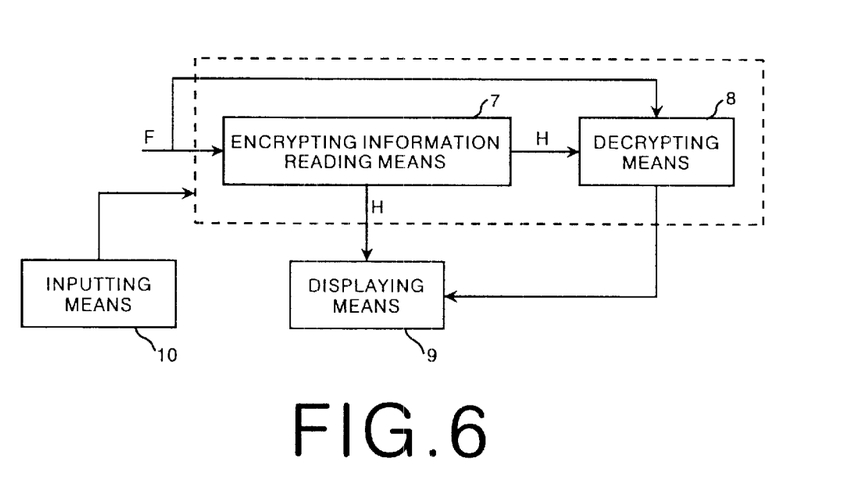
FIG. 6 is a schematic block diagram illustrating the configuration of the image decrypting device according to the embodiment of the present invention.

FIG. 6 shows a schematic block diagram illustrating the image decrypting device to decrypt the encrypted image file F thus generated. As shown in FIG. 6, the image decrypting device according to the present embodiment comprises an encrypting information reading means 7 to read out the encrypting information H from the encrypted image file F, and a decrypting means 8 to decrypt the decrypted components on the basis of the encrypting information H, being connected to a displaying means 9, such as a monitor to display the image represented by the decrypted components and the encrypting information H, and an inputting means 10, such as a keyboard and mouse. The image decrypting device according to the present embodiment may be that which receives an encrypted image file F from the image encrypting device through the network, and may be that which can receive an MO, a ZIP, a floppy disk and other recording media whereon an encrypted image file F prepared by the image encrypting device is recorded.

Next, the function of the image decrypting device according to the present embodiment will be explained. First, on the encrypting information reading means 7, the encrypting information H is read out from the encrypted image file F. The encrypting information H read out is displayed on the displaying means 9. If the person who has the image decrypting device is a FUJI Photo member, he inputs the encryption key number, which is the ID and the confidential key, from the inputting means 10, and on the basis of this encryption key number, the decrypting means 8 decrypts the key which has encrypted the hierarchical data K3, and on the basis of the decrypted key, decrypts the hierarchical data K3. And by this, the image represented by the resolution of the hierarchical data K3 is displayed on the displaying means 9.

On the other hand, from the encrypting information H, it is known that the hierarchical data K4, which has the highest resolution, can be decrypted on the FUJI Photo Lab, thus, when the encrypted image file F is to be printed out, the encrypted image file F is transferred to the FUJI Photo Lab to request it to make printout. Then, on that request, the FUJI Photo Lab decrypts the key which has encrypted the hierarchical data K4, being included in the encrypted image file F, and on this decrypted key, decrypts the hierarchical data K4 for printout.

Thus, with the present embodiment, the original image data S0 is decomposed into a plurality of components, and when a plurality of components of these components are encrypted, encrypting information H representing the contents of the encryption is generated, and an encrypted image file F is generated from the encrypted components and the non-encrypted components, and the encrypting information H, therefore, by referring to the encrypting information H, how the encrypted components have been encrypted can be easily known, and as a result of this, the encrypted image file F can be used with no confusion.

Especially when the components have been encrypted by the different encryption systems or encryption keys, respectively, the person who has received the encrypted image file F can refer to the encrypting information H for easily identifying what level of components he can decrypt by using the encryption key he has.

By including the information of the decrypting means which can decrypt the decrypted components, for example, the information of the lab in the encrypting information H, the person who has received the encrypted image file F can easily identify which lab can be requested to decrypt the desired components, thus, without confusion, the lab which has the desired decrypting means can be requested to make printout.

Next, the specific procedure for using the image decrypting device according to the present embodiment for pasting an encrypted clip art on the user image and requesting printout will be explained with reference to FIG. 7a to FIG. 7d. In this case, it is assumed that the image decrypting device is contained in the personal computer for the user who requests printout, and the user is a FUJI Photo member. It is also assumed that, in FIG. 7a to FIG. 7d, the image represented by the encrypted image file F is the clip art to be pasted on the image which the user has. First, on the encrypting information reading means 7, the encrypting information H is read out from the encrypted image file F. From the inputting means 10, the user inputs that the image is to be displayed. By this, the displaying means 9 displays the image (FIG. 7a) represented by the encrypted image file F is displayed, however, this image is an image of a low resolution represented by the hierarchical data K1 and K2 which have not been encrypted.

Figure 7A:
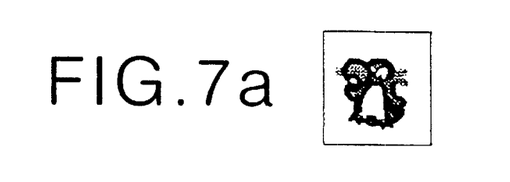
FIG. 7a to FIG. 7d show a set of drawings (first of the two) for explaining the processing provided by the image decrypting device according to the embodiment of the present invention.
Figure 7B:
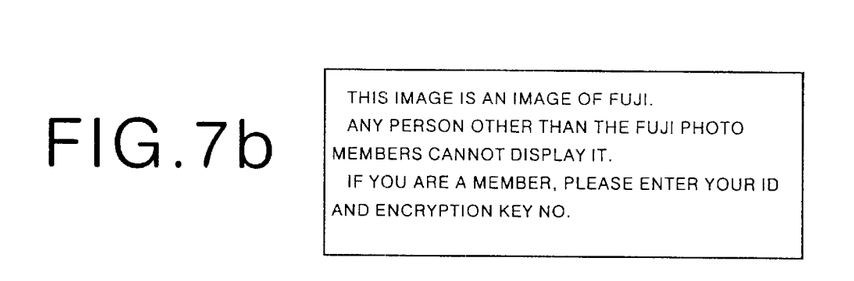
Figure 7C:
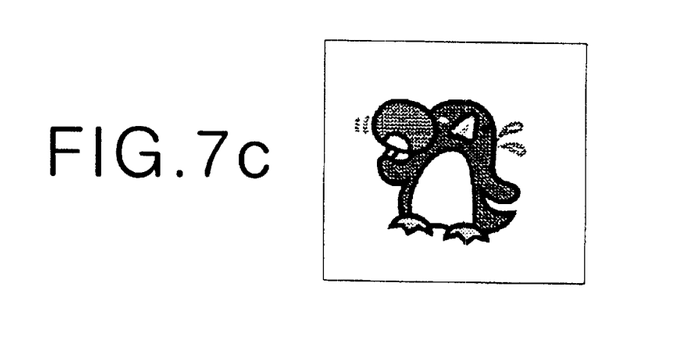

Further, when the user inputs, from the inputting means 10, that the hierarchical data K3, which has been encrypted, is to be displayed, the information as shown in FIG. 7b is displayed on the displaying means 9 on the basis of the encrypting information H. Then, on this display, the user inputs the ID and encryption key number from the inputting means 10. The decrypting means 9 certifies that the ID and encryption key number inputted is correct. If it has not been certified, the image on the resolution of the hierarchical data K3 is not displayed, while, if it has been certified, the key which has encrypted the hierarchical data K3 is decrypted on the basis of the encryption key number inputted, and on the decrypted key, the hierarchical data K3 is decrypted. Then, by this, the image represented by the resolution of the hierarchical data K3 is displayed on the displaying means 9 (FIG. 7c).

Figure 7D:
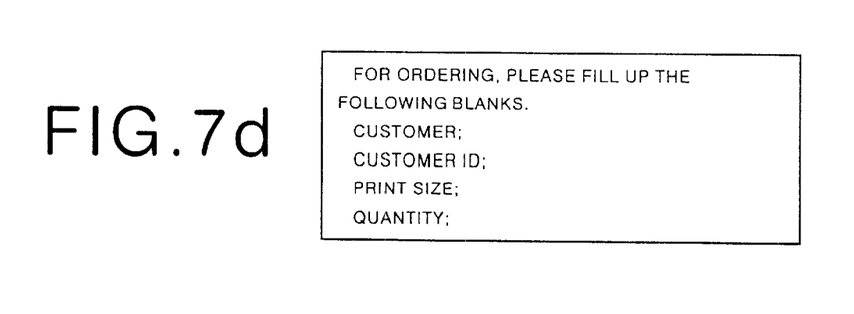
Figure 8:
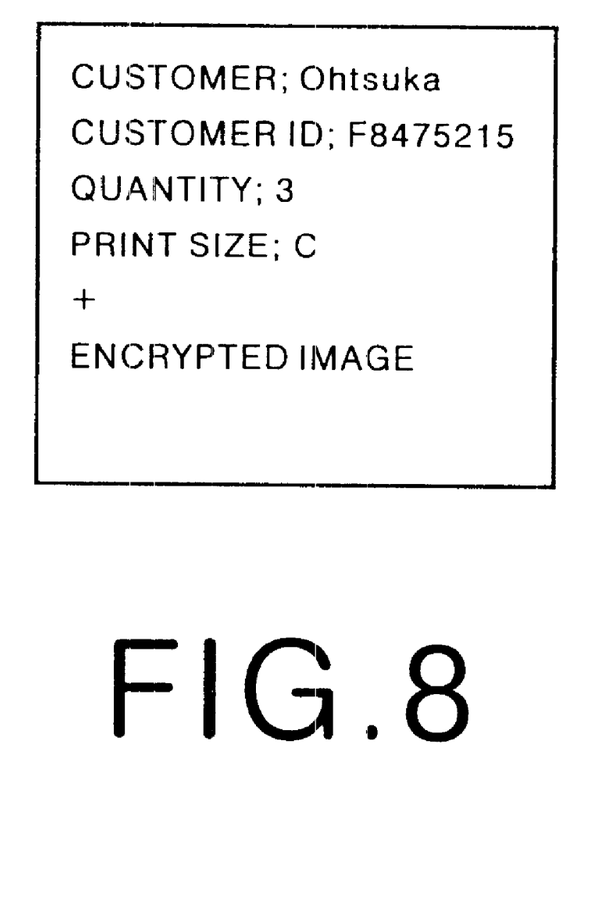
FIG. 8 shows a drawing (first of the two) for explaining the contents of the order file.

Thereafter, from the inputting means 10, the user inputs a request for printout on the lab. In this case, the display on the input screen is as shown in FIG. 7d. On this display, the user fills up the blanks, and by this, an order file is prepared by the order file preparing means (not shown). FIG. 8 shows the contents of this order file. As shown in FIG. 8, the order file includes the customer name (Customer), the ID (CustomerID), the number of prints (Quantity), and the print size (PrintSize).

From the encrypting information H, it is known that the hierarchical data K4 which has the highest resolution can be decrypted on the FUJI Photo Lab, thus, the user transfers this order file to the FUJI Photo Lab together with the encrypted image file F through the network or by recording them on a recording medium. By this, on the basis of the contents of the order file, the FUJI Photo Lab decrypts the key which has encrypted the hierarchical data K4, being included in the encrypted image file F, and further, on this decrypted key, decrypts the hierarchical data K4. Then, the clip art obtained on the resolution of the hierarchical data K4 is pasted on the image data for the user to make printout.

Figure 9A:
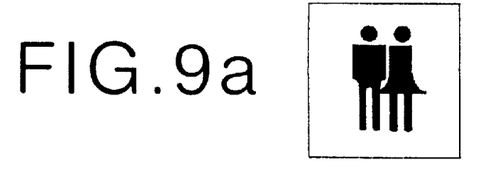
FIG. 9a to FIG. 9d show a set of drawings (second of the two) for explaining the processing provided by the image decrypting device according to the embodiment of the present invention and FIG. 10 shows a drawing (second of the two) for explaining the contents of the order file.
Figure 9B:
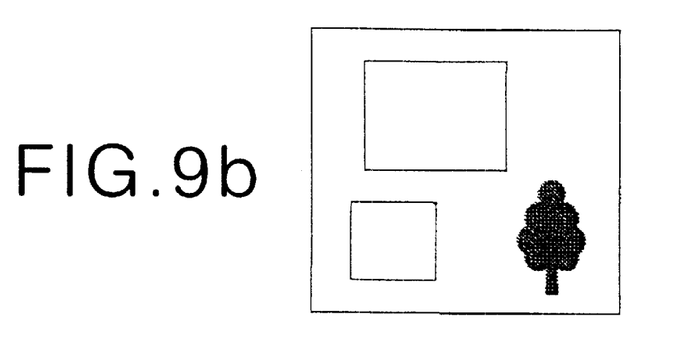

Next, the procedure for using the image decrypting device according to the present embodiment to paste a plurality of images on the template for composition, generate a single image, and request the lab to make printout will be explained with reference to FIG. 9a to FIG. 9d. In this case, it is assumed that the image decrypting device is contained in the personal computer for the user who requests printout, and the user is a FUJI Photo member. It is also assumed that the user image is that as shown in FIG. 9a, and the user image and the image of the clip art which has been encrypted as is the case with the embodiment as shown in FIG. 7 are to be pasted on the template as shown in FIG. 9b. First, on the encrypting information reading means 7, the encrypting information H is read out from the encrypted image file F. From the inputting means 10, the user inputs that the image is to be displayed. By this, as is the case with FIG. 7a above, the displaying means 9 displays the image represented by the encrypted image file F, however, this image is an image of a low resolution represented by the hierarchical data K1 and K2 which have not been encrypted.

Figure 9C:
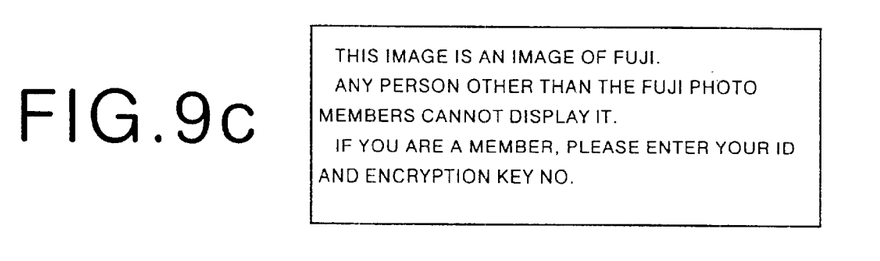

Further, when the user inputs, from the inputting means 10, that the hierarchical data K3, which has been encrypted, is to be displayed, the information as shown in FIG. 9c is displayed on the displaying means 9 on the basis of the encrypting information H. Then, on this display, the user inputs the ID and encryption key number from the inputting means 10. By this, as is the case with FIG. 7c, the image represented by the resolution of the hierarchical data K3 is displayed on the displaying means 9.

Figure 9D:
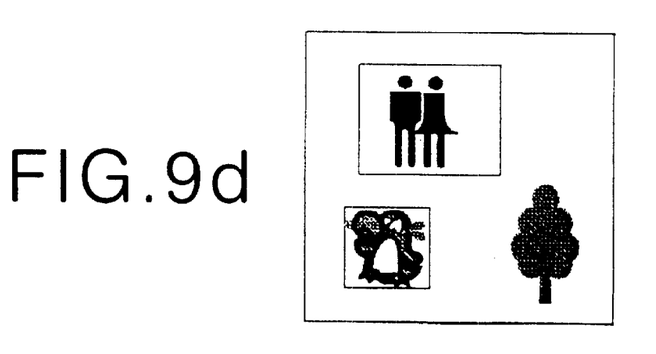
Figure 10:
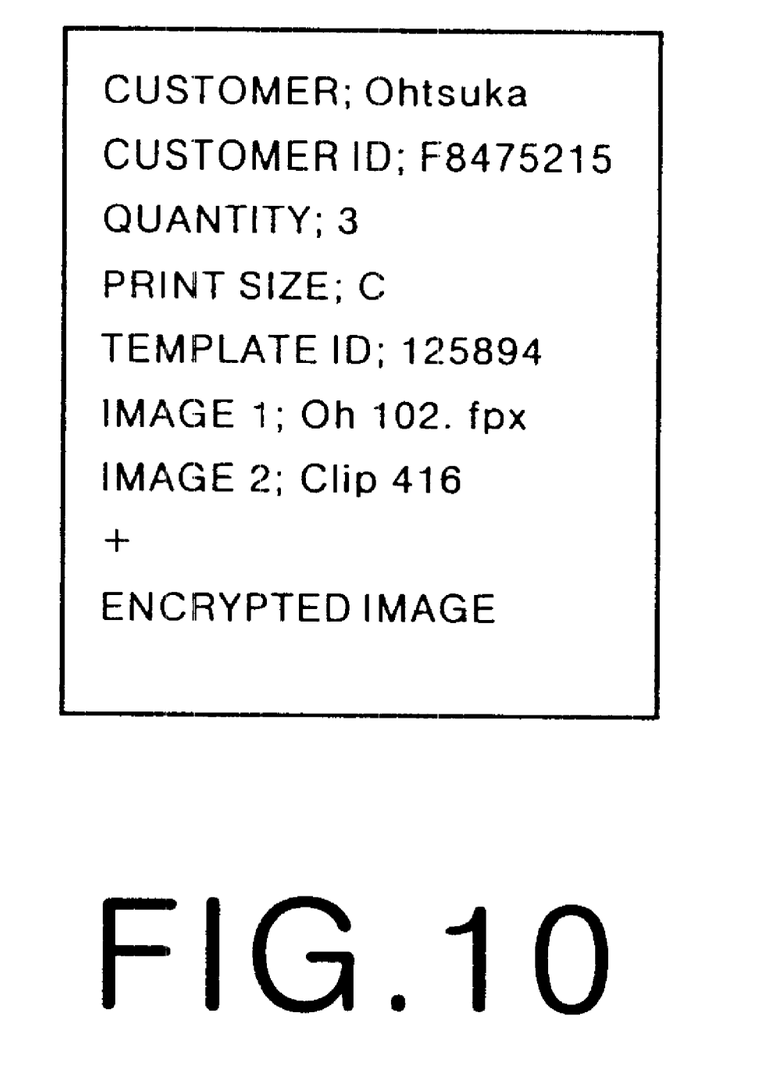

Thereafter, the user pastes the user image and the clip art on the template. Then, after completion of pasting these images as shown in FIG. 9d, the user inputs a request for printout on the lab. In this case, the display on the input screen is similar to that as shown in FIG. 7d. On this display, the user fills up the blanks, and by this, an order file is prepared by the order file preparing means (not shown). FIG. 10 shows the contents of this order file. As shown in FIG. 10, the order file includes the customer name (Customer), the ID (CustomerID), the number of prints (Quantity), the print size (PrintSize), the template ID (TemplateID), and the images to be pasted (Image1 and Image2). The Image1 means the user image and the Image2 the clip art.

From the encrypting information H, it is known that the hierarchical data K4 which has the highest resolution can be decrypted on the FUJI Photo Lab, thus, the user transfers this order file to the FUJI Photo Lab together with the encrypted image file F through the network or by recording them on a recording medium. By this, on the basis of the contents of the order file, the FUJI Photo Lab decrypts the key which has encrypted the hierarchical data K4, being included in the encrypted image file F, and further, on this decrypted key, decrypts the hierarchical data K4. Then, the clip art obtained on the resolution of the hierarchical data K4 and the user image are pasted on the template to make printout.

With the above-stated embodiment, the encrypting information H is included in the encrypted image file F, however, the present invention is not limited to this, and the encrypting information H may be included in a file different from the encrypted image file F. In addition, when an order is issued to the lab, the encrypting information H may be included in the order file. Further, the encrypting information H may be given on a paper to be attached to the recording medium whereon the encrypted image file F is recorded.

What is claimed is:

1. An image encrypting method comprising the steps of:
    decomposing original image data into a plurality of components;
    encrypting a plurality of desired components from among said components;
    preparing encrypting information representing the contents of the encryption;
    generating an encrypted image file from said encrypted components which have been encrypted, and non-encrypted components which have not been encrypted; and
    attaching said encrypting information to the encrypted image file; wherein said components are any of:
        resolution image data obtained by decomposing said original image data into a plurality of resolutions;
        luminance image data and chromaticity information data of said original image data;
        frequency data representing the spatial frequency components of said original image data.

2. An image encrypting method according to claim 1, wherein each of said components is encrypted by an encryption system or encryption key that varies with each of said components.

3. An image encrypting method according to claim 1 wherein said encrypting information includes at least one of the following:
    information that indicates that encryption has been performed;
    encryption system information;
    encryption key information;
    image component information of the original image which has been encrypted;
    copyright information of the original image; and
    information of a decrypting means that can decrypt said encrypted components.

4. An image decrypting method that decrypts an encrypted image file which has been obtained by the image encryption method according to claim 1, comprising the steps of:
    reading out said encrypting information from said encrypted image file; and
    performing decryption of said encrypted components based on said encrypting information.

5. An image decrypting method that decrypts an encrypted image file which has been obtained by the image encrypting method according to claim 1, comprising the steps of:
    reading out said encrypting information from said encrypted image file;
    determining the decrypting means that can decrypt said encrypted components based on said encrypting information; and
    transferring said encrypted image file to the determined decrypting means.

6. A computer readable recording medium that records a program to cause a computer to execute a procedure for decrypting an encrypted image file obtained by the photographic image encryption method according to claim 1, wherein said program comprises:
    a procedure for reading out said encrypting information from said encrypted image file; and
    a procedure for decrypting said encrypted components based on said encrypting information.

7. A computer readable recording medium that records a program to cause a computer to execute a procedure for decrypting an encrypted image file obtained by the photographic image encryption method according to claim 1, wherein said program comprises:
    a procedure for reading out said encrypting information from said encrypted image file;
    a determining means that determines the decrypting means that can decrypt said encrypted components based on said encrypting information; and
    a transferring means that transfers said encrypted image file to the determined decrypting means.

8. An image encrypting method according to claim 1 wherein said components may further comprise regional data.

9. An image encrypting apparatus comprising:
    a component decomposing means that decomposes original image data into a plurality of components;
    an encrypting means that encrypts a plurality of desired components from among said components;
    an encrypting information preparing means that prepares encrypting information representing the contents of the encryption;
    an encrypted file generating means that generates an encrypted image file from said encrypted components which have been encrypted, and non-encrypted components which have not been encrypted; and
    an attaching means that attaches said encrypting information to the encrypted image file; wherein
said components are any of:
    resolution image data obtained by decomposing said original image data into a plurality of resolutions;
    luminance image data and chromaticity information data of said original image data;
    frequency data representing the spatial frequency components of said original image data.

10. An image encrypting apparatus according to claim 9, wherein said encrypting means is a means that encrypts each of said components by an encryption system or encryption key that varies with each of said components.

11. An image decrypting apparatus that decrypts an encrypted image file which has been obtained with the photographic image encrypting apparatus according to claim 9, comprising:

an encrypting information reading means that reads out said encrypting information from said encrypting image file; and a decrypting means that performs decryption of said encrypted components based on said encrypting information.

12. An image decrypting apparatus that decrypts an encrypted image file which has been obtained with the photographic image encrypting apparatus according to claim 9, comprising:

an encrypting information reading means that reads out said encrypting information from said encrypted image file;

a determining means that determines the decrypting means that can decrypt said encrypted components based on said encrypting information; and a transferring means that transfers said encrypted image file to the determined decrypting means.

13. An image encrypting apparatus according to claim 9 wherein said components may further comprise regional data.

14. A computer readable recording medium that records a program to cause a computer to execute:

a procedure for decomposing original image data into a plurality of components;

a procedure for encrypting a plurality of desired components from among said components;

a procedure for preparing encrypting information representing the contents of the encryption;

a procedure for generating an encrypted image file from said encrypted components which have been encrypted, and non-encrypted components which have not been encrypted; and a procedure for attaching said encrypting information to the encrypted image file; wherein said components are any of:

resolution image data obtained by decomposing said original image data into a plurality of resolutions;

luminance image data and chromaticity information data of said original image data;

frequency data representing the spatial frequency components of said original image data.

15. A computer readable recording medium according to claim 14, wherein said procedure for encrypting is a procedure that encrypts each of said components by an encryption system or encryption key that varies with each of said components.

16. A computer readable recording medium that records a program to cause a computer to execute a procedure according to claim 14, wherein said components may further comprise regional data.

* * * * *